Nov. 13, 1928.

R. G. ANDERSON 1,691,796

BLANK CUTTING MACHINE

Filed Jan. 7, 1927    6 Sheets-Sheet 1

INVENTOR
Roland G. Anderson
BY
ATTORNEY

Nov. 13, 1928.   1,691,796
R. G. ANDERSON
BLANK CUTTING MACHINE
Filed Jan. 7, 1927   6 Sheets-Sheet 2
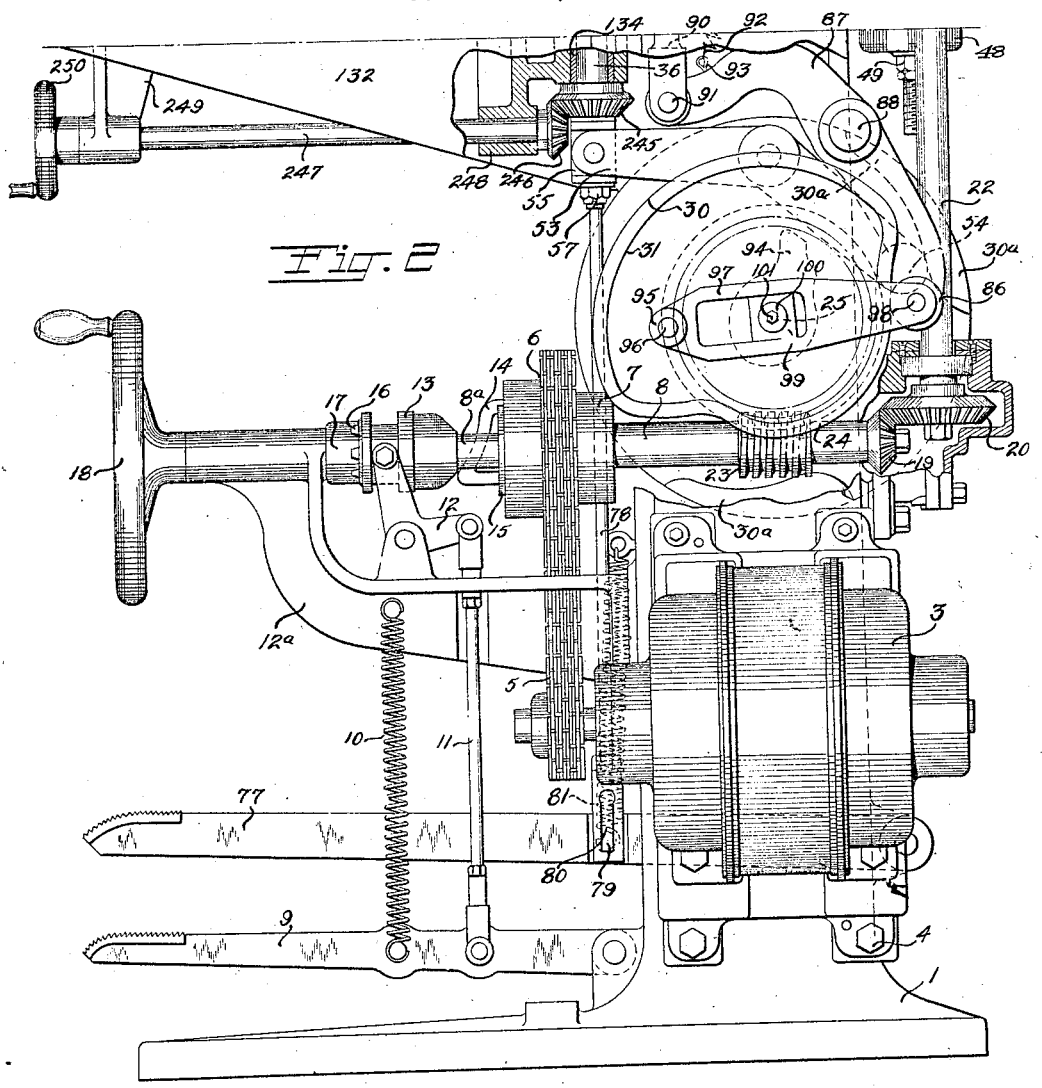
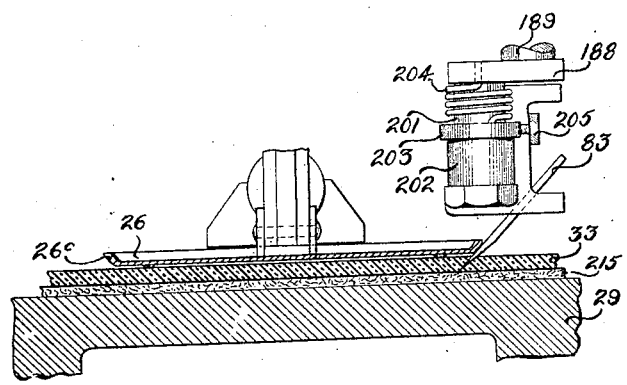
INVENTOR
Roland G. Anderson
BY
ATTORNEY

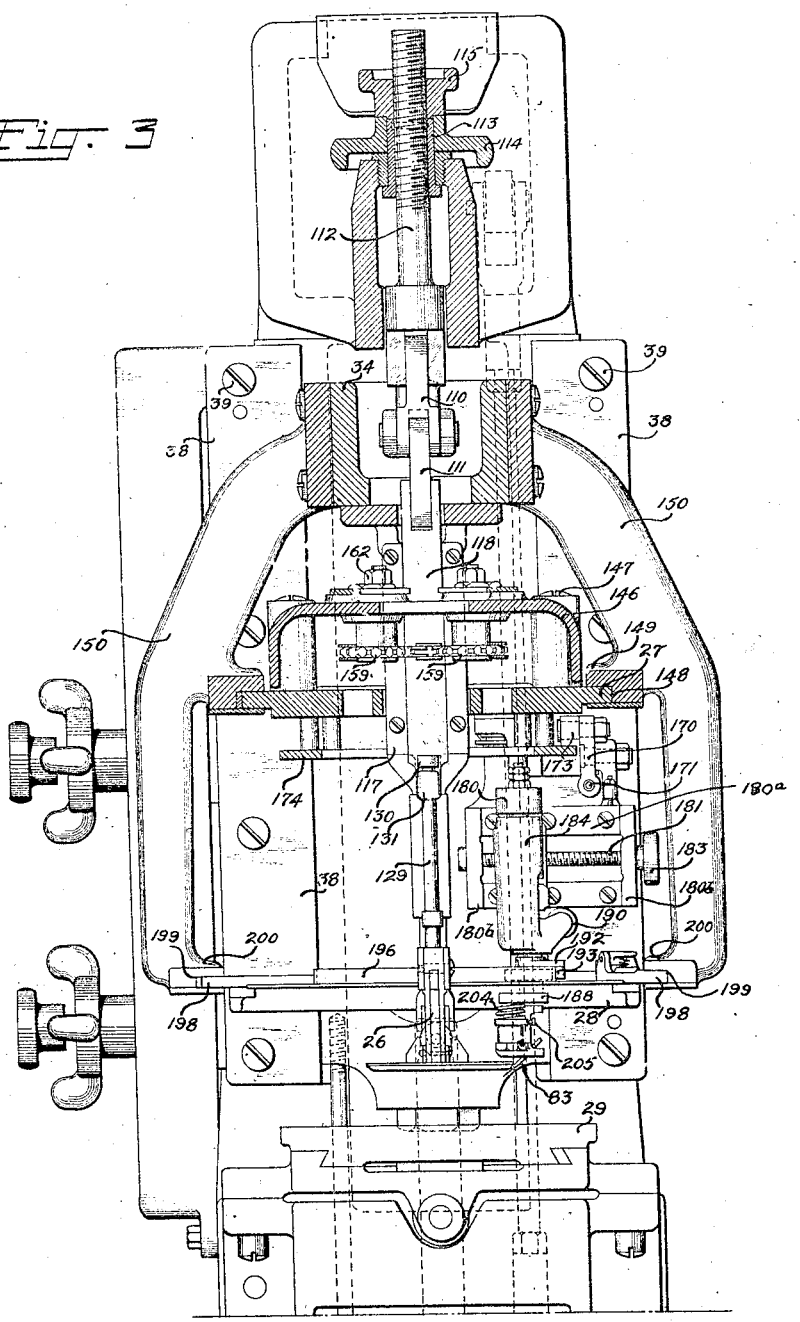

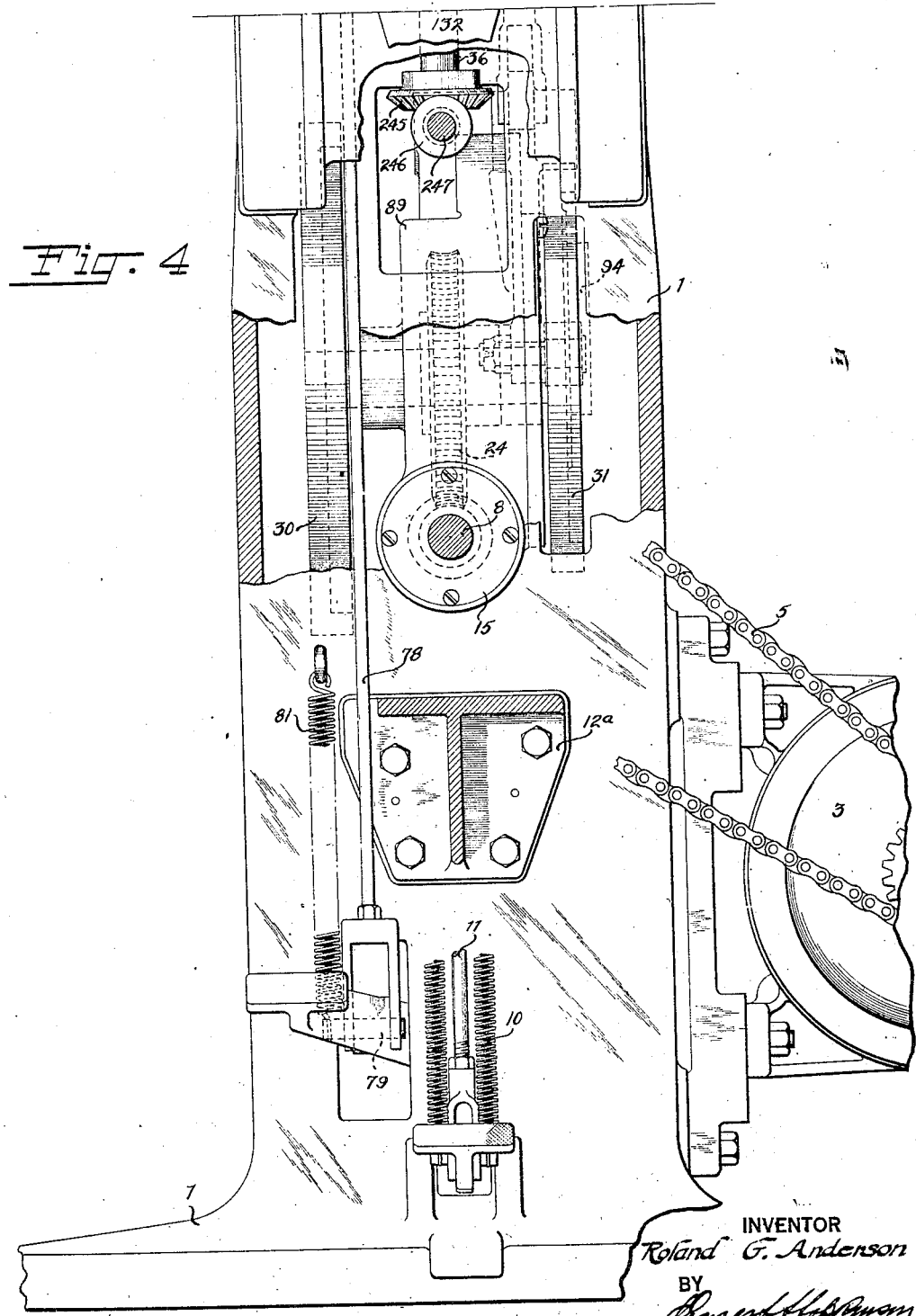

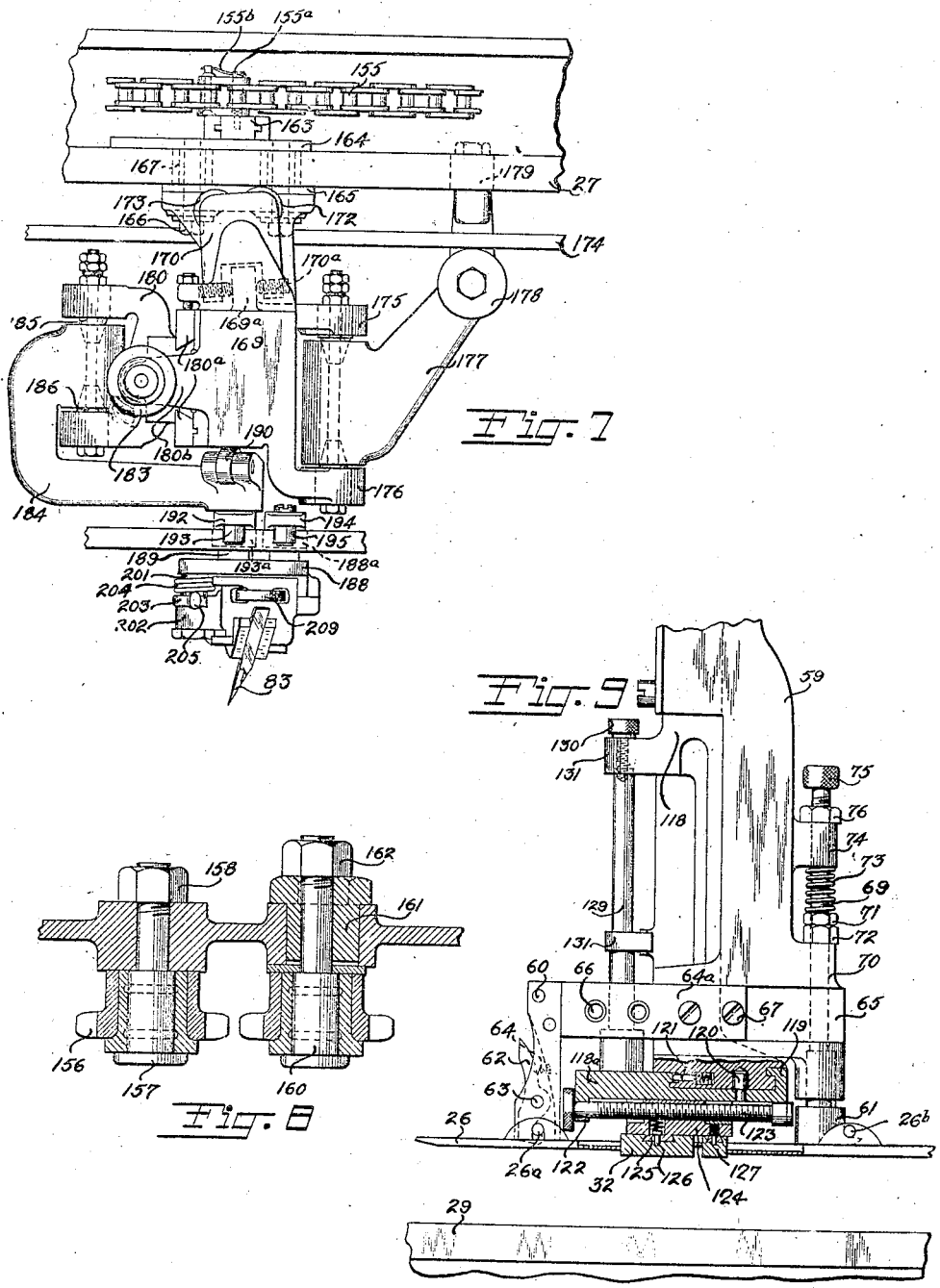

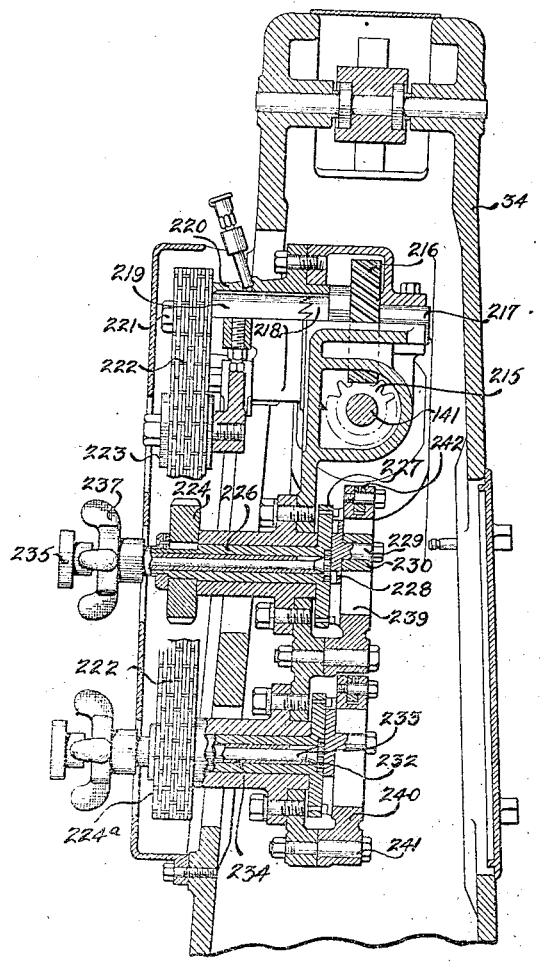
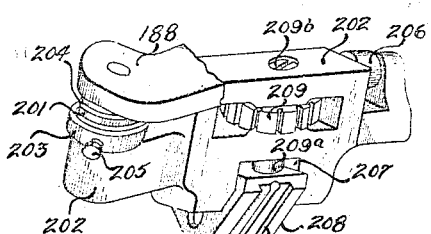

Patented Nov. 13, 1928.

1,691,796

UNITED STATES PATENT OFFICE.

ROLAND G. ANDERSON, OF NEW HAVEN, CONNECTICUT, ASSIGNOR TO L. CANDEE AND COMPANY, OF NEW HAVEN, CONNECTICUT, A CORPORATION OF CONNECTICUT.

BLANK-CUTTING MACHINE.

Application filed January 7, 1927. Serial No. 159,577.

This invention relates to a machine for cutting and embossing blanks. More particularly it relates to a machine for cutting rubber soles from sheet stock and for embossing the same.

In machines for cutting soles, patterns are used which are provided with sharp projections such as a pointed toe or a projection at the heel around which the knife must pass. Machines have been devised for driving a knife around the pattern in which the driving means is an endless conveyor which travels in a path having the general shape of the pattern. In these machines it has been customary to dispose the knife in the rear of the point through which the driving forces are transmitted from the conveyor to the knife carrier. The rounding of each turn by the portion of the conveyor from which the power is transmitted, causes the knife to tend to follow a similar course. Consequently with the turns in the pattern and conveyor substantially in alignment, the knife tends to cut through the portion of the pattern projecting into its path and in resisting this tendency the apparatus is subjected to excessive strain. Machines of this type, as previously constructed, have passed the knife around the pattern at a rate of speed sufficiently rapid to cause the knife to swing away from the pattern by its own momentum in rounding the sharp turns, thereby causing misshapement of the sole. When used for cutting a blank with an under bevel, it is necessary to provide some means for preventing the knife from injuring the blank when it is removed after the cutting operation. Devices for this purpose have hitherto been relatively complicated and inefficient.

It is an object of this invention to provide for the smooth rapid movement of a knife around a stationary pattern. It is a further object to provide for the positive engagement of the knife with the pattern when rounding sharp turns of the pattern. Still another object is to provide a mechanism for passing a knife around a pointed pattern without increasing the pressure of the knife against the pattern adjacent the turns of the pattern.

A further object is to provide a simple expedient for removing the knife without injury to the blank after cutting a blank with an under bevel. The invention aims generally to improve sole cutting mechanism as regards simplicity, ease of operation, capacity, accuracy and quietness.

For a detailed disclosure of the invention, reference is had to the accompanying specification and drawings, in which latter;

Fig. 2 is a side elevation of the portion of the machine below that shown in Fig. 1;

Fig. 3 is a front elevation partly in section of the cutting and embossing mechanism;

Fig. 4 is a front elevation partly in section of the portion of the machine below that shown in Fig. 3;

Fig. 6 is a section through the sole pattern and work bed showing the knife block with the knife in cutting position;

Fig. 7 is a side view of the truck and knife block;

Fig. 8 is a detail of the chain tightening mechanism;

Fig. 9 is a side view partly in section of the die holder and the pattern supporting mechanism;

Fig. 10 is a sectional detail view of the actuating means for the drive bonnet and leader;

Fig. 11 is a transverse sectional view through the knife block holder; and

Fig. 12 is a perspective view of the knife block holder.

Figure 1:
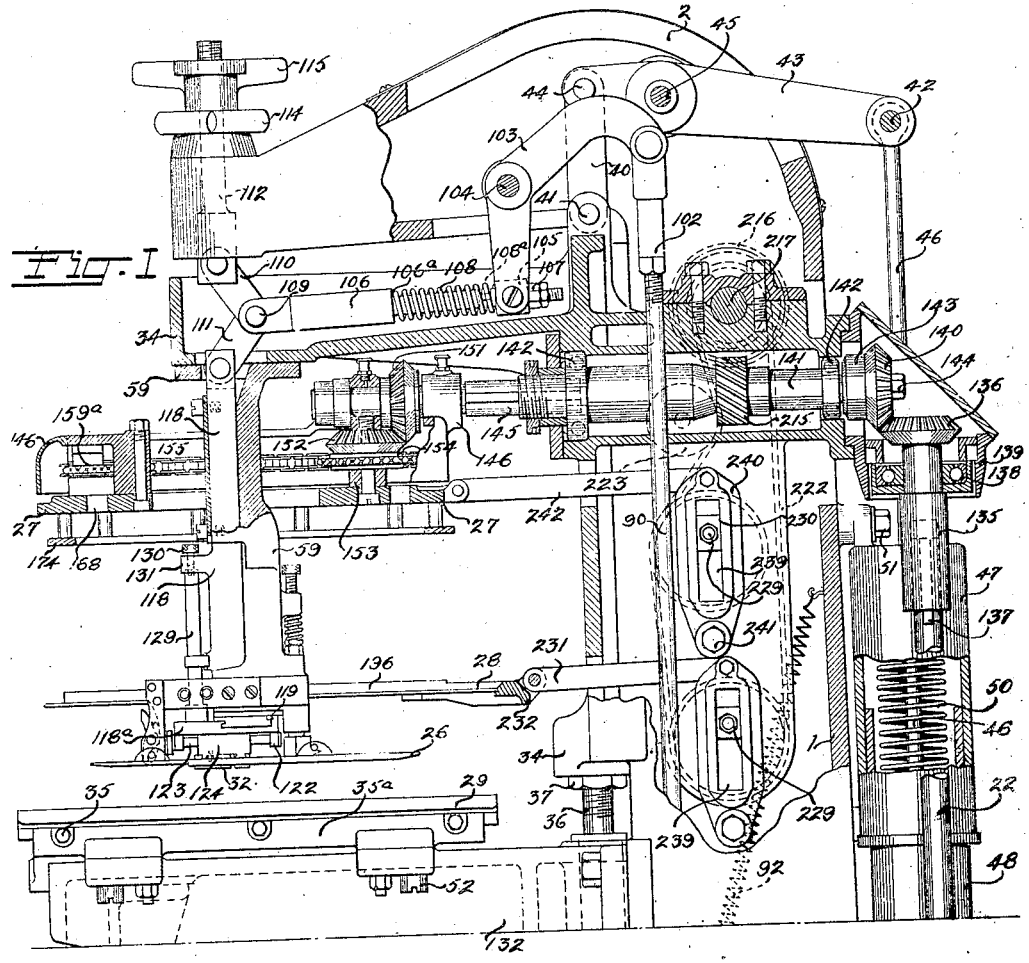
Fig. 1 is a side elevation partly in section of the upper part of the machine.

Referring to the drawings, more particularly to Figs. 1 and 2, the numeral 1 designates the main frame of the machine which at its upper end is provided with an overhanging arm 2. The main drive of the machine is formed through the following elements: A motor 3 is mounted at the base of the frame 1 by bolts 4 and by means of chain 5 drives a sprocket 6 freely mounted in ball bearings 7 upon the shaft 8. The sprocket is clutched to the shaft in driving relation by the following elements. The foot lever 9 is pivotally mounted at the base of the machine and normally held in raised position by the tension spring 10. A link 11 connects the lever 9 with an arm of the bell crank lever 12, which latter is pivotally mounted upon a bracket 12ᵃ which extends from the frame 1. The other arm of the bell crank 12 is pivotally attached to a sleeve 110

13 which is keyed loosely to the portion 8ª of the shaft 8 so that it has longitudinal sliding movement thereon. Upon pressing the foot lever 9 downwardly, the sleeve 13 is moved forwardly pressing against the arm 14 of a well known form of clutch so as to tighten the clutch member 15 against the cooperating clutch member formed by the hub of the sprocket 6. Upon elevation of the foot lever 9, the sleeve 13 moves to a position to release the engagement of the clutch members and brings teeth 16 carried by the sleeve 13 into engagement with a collar 17 which is rigidly connected with the hand wheel 18. Hand wheel 18 is used to turn the machine over manually when desired.

The power is distributed from shaft 8 to operate the machine through two separate trains of connections.

The gear wheel 19 is carried at the opposite end of the shaft 8 and is adapted to mesh with a bevel gear 20 which in turn is rigidly mounted upon the vertical shaft 22 which drives the cutting mechanism in a manner to be later described.

The cutting means moves around a pattern 26 and is connected by a flexible driving connection to the source of power. The path of this flexible driving connection is caused to gradually approach the exact shape of the pattern by means of the truck guiding plate 27 and a leader 28, to be later described, and this truck guiding plate and leader may be given longitudinal movement to lengthen or shorten the paths which they define for the flexible connection, when cutting large or small soles. Worm 23 is mounted upon the shaft 8 and engages a worm wheel 24 which is mounted upon a transversely extending cam shaft 25. A cam 30 is carried thereby to raise and lower the work head with respect to the work bed in clamping the work. A second cam 31 carried by the cam shaft 25 causes intermittent raising and lowering of the embossing die 32 whereby the work 33 is suitably embossed.

*Work clamping mechanism.*—A primary step in the operation is to clamp the material 33 to be cut, known as the work, securely in place upon a work bed 29 and the elements for accomplishing this step will now be described. A head 34 is slidably carried in the upper part of the frame 1 and extends outwardly in a general direction parallel to the overhanging arm 2 of the machine. This head is automatically or manually moved in the frame 1 to clamp or release the work by means of a driving connection including the adjustable spindle 36. The spindle is rotatable in the frame 1 and has screw threaded engagement with a hardened sleeve 37 which is rigidly carried in the head 34. Rotation of the spindle adjusts the length of the driving connection for the head thereby determining the amount of pressure applied by the pattern 26 upon the work. The head 34 is slidably held in the frame 1 by means of two gib plates 38 which are securely fastened to the frame 1 by bolts 39, as shown in Fig. 3. Slide surfaces in the head are held between the gib plates 38 in the frame 1 for sliding movement with respect thereto.

The head 34 with the elements supported thereby is of considerable weight and provision is made for approximately balancing the same as follows: A link 40 is pivotally secured to the head at one end by means of a pin 41 and at its other end is connected with the rocker arm 43 by means of a pin 44. The rocker arm is pivotally carried by the overhanging arm 2 by means of a pin 45, the opposite end of the rocker arm is attached to two tie rods 46 by means of a pin 42. Each tie rod extends downwardly through a hole in the spring operated telescopic retaining sleeves 47 and 48. The tie rods 46 are threaded upon their lower ends to receive check nuts 49 (see Fig. 2), which are located immediately below and bear against the inner spring retaining sleeves 48. A spring 50 positioned within each pair of the telescoping sleeves tends to normally press them apart. The lower sleeves 48 telescope within the sleeves 47 upon actuation of the head 34. The upper sleeves 47 are rigidly secured to the frame 1 by the bolts 51. Adjustment to get the proper tension upon the springs so that the head 34 is normally maintained suspended, is made by adjusting the check nuts upon the threaded extremities of the tie rods.

The spindle 36 forming part of the driving connection for the head 34 is actuated vertically through connection with the cam 30 (see Fig. 2) which is rigidly secured to the cam shaft 25. The connection includes a lever 53 which is pivotally connected at one end to a block 55 carried by the spindle 36 and at its opposite end carries a hardened roll 54 which bears against the cam surface. The block 55 is locked in place upon the spindle 36 by the nut 57. A suitable adjustment of the spring 50 for the successful operation of the device is such that the head is pulled upwardly with an upward force of about thirty pounds. The upward pull of the head accordingly maintains the hardened roll 54 in engagement with the cam surface. As the cam rotates, the high spot thereof forces the hard roll 54 outwardly thereby lowering the head 34. When the low spot of the cam comes in engagement with the hardened roll 54, the force of the springs is such as to cause the elevation of the head. Overhanging shoulders 30ª at the juncture of the high and low spots of the cam insure that the hardened roll positively follows the surface of the cam.

In order to adjust the work table so that the pattern 26 will have correct contact with the material to be cut, the work table is first centered by means of set screws 35 whereby it is moved transversely of the platform 35ª. Screws 52, which are mounted in pairs in the bracket 132 are adjustable to raise or lower the work table as desired. One of each pair of screws is adapted to push the platform from the bracket and the other is adapted to pull the same together.

Vertical adjustment of the movable head is provided for as follows: The spindle 36 passes through the bushing 134 which is rotatably mounted in the bracket 132. The bushing is provided with a keyway throughout its length adapted to be engaged by a key projecting from the spindle. Bevel gear 245 projects rigidly from the bushing 134. A companion bevel gear 246 meshes with this gear and is carried by a shaft 247 which is rotatably mounted in arms 248 and 249 which extend from the bracket 132. A hand wheel 250 is carried upon the shaft 247. Rotation of the hand wheel causes the bevel gear 246 to rotate the spindle 36 thereby either shortening or lengthening the driving connection to the head 34.

The pedestal 59 projects downwardly from the head 24 and is provided at its base with a foot designed to carry the pattern 26. The foot is made in two sections 60 and 61 (see Fig. 9), one of which 60 is secured to the pedestal for horizontal adjustment and the other 61 for vertical adjustment.

The horizontally adjustable section 60 is formed of a body portion which is slotted at its end to form a groove in which latch 62 is pivoted at 63. A spring 64 normally presses the hooked end of the latch into engagement with a pin 26ª on the form 26 thereby securing this end of the pattern but permitting pivotal movement of the same. Section 60 carries at its upper portion slide plates 64ª in spaced relation which slide in grooves 65 in the pedestal. The slide plates are provided with a plurality of holes 66 which can be brought into alignment with holes in pedestal 59 and held in adjusted position by the binding screws 67. Upon removal of the binding screws, the foot piece can be adjusted in the slides to three previously determined positions. These adjustments are provided whereby forms of varying sizes can be affixed to the pedestal.

The vertically adjustable foot piece 61 engages a pin 26ᵇ on the pattern 26 and is provided with a spindle 69 which extends vertically through an extending boss 70 in the pedestal 59 and is held suspended by the nut 72 which is threaded thereon. Nut 72 controls the extent to which the spindle can be lowered and nut 71 locks the adjustment. Pressing against the upper side of the lock nut 71 is a coil spring 73 which surrounds the spindle 69. The upper end of the spring bears against an extending boss 74 carried by the pedestal 59. The purpose of the spring is to normally maintain the spindle in its lower-most position. A stop screw 75 for the upper end of spindle 69 passes through the boss 74 in screw threaded engagement therewith and can be locked in adjusted position by the nut 76.

The pattern used for cutting underbeveled soles is of the type described in my previously filed joint application, Serial No. 120,315 filed July 3, 1926, the side walls 26ᶜ of which are underbeveled. The extension of the side walls is increased around the sole portion and instep portion of the pattern in order that it will function to force the knife 83 laterally as the knife is raised.

The head 34 may be manually operated by means of a foot pedal 77 which is connected by tie rod 78 with the driving connection for head 34. The lower end of the tie rod is forked and straddles the pedal 77 and has a sliding fit therewith through a pin 79 which extends rigidly from the pedal into the elongated slot 80 in each fork. A spring 81 attached to the frame 1 normally maintains the pedal in suspended position with the pin 79 in the lower portion of the slot 80. The purpose of the pin and slot connection between the pedal and tie rod is to permit of movement of the tie rod vertically with the head 34 during operation of the machine without causing movement of the pedal. Vertical adjustment of the foot piece 61 must vary with the thickness of the material to be cut in order that the form 26 shall hold the material securely at all points. This adjustment is accomplished as follows: The pedal 77 is pressed downwardly to draw the tie rod 78 and head 34 down until the form 26 carried by the foot pieces engages the work 33. The lock nut 76 is now released and the screw 75 is elevated for clearance of the foot spindle 69. The locking and adjusting nuts 71 and 72 upon the foot spindle are elevated. The form 26 is then forced by the spring 73 into correct position against the material to be cut. Thereupon the adjusting and locking nuts 71 and 72 are brought into position bearing against the boss 70 of the pedestal 59. The adjustable positioning screw 75 is also brought into position bearing against the end of the spindle 69 and locked by means of the lock nut 76. The set screw 75 limits the upward movement of the spindle 69.

When the machine is to be used for cutting under beveled soles for rolled edge footwear, an additional adjustment can be made which will provide for withdrawal of the knife after cutting a blank without mutilation of the blank. Having adjusted the screw 75 as just described for the particular stock being cut, provision is made for a slight amount of vertical play of the spindle 69 below the screw 75. The pattern is provided with an under beveled edge which the knife is to follow. The bevel at the heel portion thereof is normally made of slight extent in order to provide merely a workable surface for the knife to engage. The width of the beveled edge around the sole and instep of the pattern is increased so that it functions in the following way: In cutting a sole, the knife is lowered with the pattern until it passes entirely through the stock and contacts with the backing material 215, but due to a slight forward inclination of the pattern by reason of the pressure of spring 73 this end of the pattern halts in its vertical movement before the knife does, and hence the inclined knife also moves slightly laterally inward on the bevelled edge of the pattern into proper cutting position. The knife enters the stock while traveling from the heel portion of the pattern around the sole portion and makes a complete revolution around the pattern while cutting the stock; and while passing a second time around the sole pattern is elevated with the pattern from the stock. The reverse action now takes place, the knife rising slightly ahead of the forward end of the pattern, and as a result the knife moves laterally outward on the bevelled edge of the pattern as the knife is withdrawing from the work so that the overlying beveled sole edge is not injured as would happen if the knife withdrew vertically. The vertical play is provided for by adjusting the two nuts 71 and 72 upon the foot spindle 69. The distance which the nuts are removed is determined by trial and will be varied with the depth through which the knife extends through the stock. A suitable amount of play in the usual practice is about $\frac{3}{16}$ of an inch.

*Embossing mechanism.*—While the material to be cut is held firmly against the bed plate by the form 26, it is also subjected to an embossing operation. This is effected through an embossing die 32 which is movable through the sole pattern independently thereof, being carried by a slide 118 which is actuated in timed relation with the movement of the head 34 as will be described. The source of power is derived from the main drive supplied to the cam shaft 25 which operates the cam 31. The periphery of this cam 31 is engaged by a hardened roll 86 carried by the extremity of the rocker arm 87 which latter is pivoted upon a stud 88 in the frame 1. The opposite end of the rocker arm 87 is pivotally connected with the rod 90 through pin 91. The cam 31 rotates in a clockwise direction, as viewed in Fig. 2. The roll 86 closely follows its surface by reason of the pressure exerted by spring 92 extending from a hook 93 attached near the opposite extremity of the rocker arm and connecting with the frame 1. This spring 92 is maintained under pressure at all times. It is desirable that the hardened roll 86 accurately follow the cam surface 70 when passing from a high to a low spot and the following elements are provided to effect the same. A lever 97 is pivotally secured to the hardened roll 86 at one extremity and is provided with a slot which is adapted to be slidably carried upon a block 99 which is mounted upon the cam shaft 25 being held thereon by washer 100 and nut 101. The opposite end of the lever 97 carries a hardened roll 95 which is adapted to be engaged by a secondary cam 94 which is attached to the side of the cam 31. The two cams are so arranged that as the roll 86 passes the high spot of the cam 31, the roll 95 will be engaged by the cam 94 forcing the roll outwardly and thereby causing the roll 86 to closely follow the cam 31.

The arrangement of cams and levers just described actuates the rod 90 vertically. Rod 90 has screw threaded engagement at its upper end with a sleeve 102 which is pivotally connected to a bell crank 103 which latter is pivoted to the overhanging arm 2 by the pintle 104. The opposite end of the bell crank is bifurcated and receives a swivel block 105. A rod 106 projects through the swivel block. A spring 108 positioned upon the rod 106 abuts at one end against the shoulder 106ª and at its other end against the swivel block. Nuts 107 secure the rod 106 in place. The spring provides for resilience in the pressure of the rocker arm 103 against the rod 106. There is a second shoulder 108ª on the rod 106. This shoulder takes the direct thrust from the swivel block 105 when the spring 108 is compressed. At the opposite end of said rod 106, pivoted at 109, is a toggle comprising the toggle arms 110 and 111. The toggle arm 110 is also connected to an adjusting arm 112 which is threadedly connected to a bearing sleeve 113 (see Fig. 3). The bearing sleeve is rigidly connected with a hand nut 114 and mounted for swiveling movement in the overhanging arm 2. In order to lock the bearing sleeve in adjusted position, a nut 115 is also threaded on the rod 112. Vertical adjustment of the rod 112 is made before embossing each gauge of material in order that the die will bear against the material to the desired extent. The toggle link 111 is connected (see Fig. 1) to the slide 118 which is movable in the channel in the pedestal 59, the slide being held by plates 117.

At its lower end, the embossing slide 118 is slightly enlarged to provide a head to which the medallion adjusting bracket 118ª can be secured. The head is provided with broken horizontally disposed circular grooves so that corresponding ribs 119 carried by the bracket 118ª can be placed opposite the grooves after which the bracket can be turned 90° to slide the ribs into the grooves, thereby securing the bracket to the head. A centering pin 120 projects from the head and is adapted to engage a slot in the bracket to assist the operator in the rapid positioning of the bracket in engagement with the grooves. A spring pressed snap pin 121 in the head of the embossing slide is provided to engage a suitable recess in the bracket and thereby hold the bracket in its proper position.

Projecting from opposite ends of the lower surface of the bracket 118ª, are two extensions 122 in which is journalled the medallion block adjusting screw 123. The medallion block 124 is provided with an aperture threaded to engage the screw so that the block can be adjusted horizontally by manually turning the screw. In the present instance the medallion block is adapted to support two dies, one for embossing the size and the other for embossing a trade mark or other emblem. In order to secure the dies in position, dove-tailed projections 125 are secured to the bottom of the medallion block through which are adapted to project spring pressed detents 126. The dies 32 and 127 are provided with dove-tailed grooves fitting the respective projections and are held in position by the engagement of the detents 126 with corresponding recesses in the dies. As shown in Figs. 1 and 9, the machine is arranged for cutting a relatively large sole, in which case a relatively large bracket 118ª and medallion block 124 are also used. In order to take up the strain upon the projecting portion of the bracket 118ª, a thrust rod 129 is provided, the base of which rests upon the bracket 118ª and the upper portion of which extends upwardly through bosses 131 projecting from the embossing slide 118. The upper end of the thrust rod 129 is provided with a depression adapted to be engaged by an adjusting screw 130 which is threaded into the upper boss 131.

It will be seen from the arrangement of cams 30 and 31 that the die is operated to bear against the blank at a time after the pattern is forced against the stock and that the die is raised before the blank is raised. The die is forced against the stock with an increasing pressure according to the design of spring 108. When sufficient pressure compresses this spring swivel block 105 contacts with shoulder 108ª. The embossing operation is effected entirely without sharp impact or blow of the die against the stock.

Figure 5:
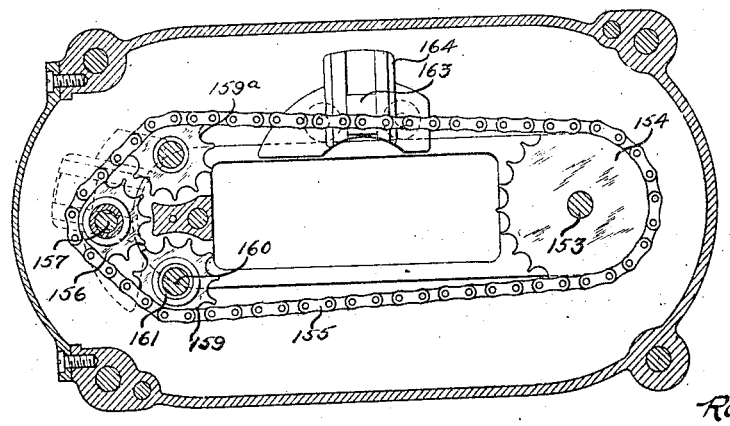
Fig. 5 is a section through the bonnet showing the driving mechanism for the knife carrier.

*Cutting mechanism.*—While the material to be cut is clamped between the form 26 and the work bed 29, the cutting mechanism is functioning. Driving means for the cutting mechanism lies through the shaft 22 which drives sleeve 135, which in turn rigidly carries the bevel gear 136. Since the cutting mechanism is carried by the movable head 34, it is necessary that there be an adjustable driving connection for the cutting mechanism. This is secured by providing the shaft 22 with four keys 137 projecting therefrom, which keys slidably engage four keyways in the sleeve 135. The sleeve is carried in ball bearings 138 which are secured in a housing 139. The housing is rigidly secured to the sliding head 34 by means of screws or in any other suitable manner. The sleeve 135 is thus adapted to compensate for a vertical sliding movement as well as transmit a rotary movement of shaft 22. The spiral bevel gear 136 meshes with a companion gear 140 carried on an upper horizontal shaft 141 which is rotatably mounted in the head 34 through bearings 142. The gear 140 is adjustably secured to the shaft 141 through ratchet teeth (not shown) at the rear of the gear which engage similar teeth on a collar 143 secured to the shaft. A bolt 144 serves to lock the gear in adjusted position. The forward end of the shaft 141 is tubular and is telescopically keyed in any desired manner to a shaft 145 mounted in the drive bonnet 146, which latter is secured by the bolts 147 (see Fig. 3) to a truck guiding plate 27. The latter is slidably mounted in channels 148 formed in extensions 149 of the depending side arms 150 which are in turn secured to the head 34. Mounted on the shaft 145 is a gear 151 meshing with a gear 152 journalled on a short shaft 153 mounted in the truck guiding plate 27. Rigid with the gear 152 is a sprocket 154 over which runs a truck driving chain 155, this chain at its forward end passing over three small sprockets (Figs. 5 and 8), one of which 156, has a fixed bearing in the bonnet 146 by means of the stud shaft 157 and nut 158. Sprocket 156 is positioned vertically above the heel point of the pattern 26 and slightly in front thereof. Two other sprockets 159 and 159ª are also carried by the bonnet 146 but their shafts 160 are eccentrically mounted in the adjustable bushings 161 rotatably adjustable in the bonnet 146. Hence, by rotating the bushings 161, the sprockets 159 can be moved to vary the tension of the chain 155 and then locked in position by the nuts 162. Other conveyors can be substituted for the chain if desired.

The chain 155 has attached to it by a heavy link, a block 163. The connecting means is a chain pin 155ª which is threaded into the link and is provided with a pilot or extension which fits into a hole in the slide block 163. A spring 155ᵇ holds the pin in position. By virtue of having the driving connection through the pin 155ª, strain caused by jamming of any of the moving parts will cause the pin, rather than an expensive element of the device, to break. The pin is readily replaced when broken. The driving forces for the knife are transmitted from the conveyor through the pin. Block 163 has sliding engagement with an extension of the plate 164 through a suitable tongue and groove connection therewith. Plate 164 is guided in its course by being attached to a lower plate 165 through bolts 166 which pass through a continuous slot 168 in the guide 27. Anti-friction rolls 167 surround the bolts. Thus an anti-friction slide is created which follows the slot 168 in the guide plate 27, making two complete revolutions for the operation of cutting out one sole in a non-fibrous material, such as rubber. The slot 168 extends in the general oblong outline of a shoe sole.

The cutting mechanism comprises the truck or carriage 169 which is attached to the plate 165 by the same bolts 166 that bind the plates 164 and 165 together. The truck 169 carries a swinging bracket 170, pivoted to the truck 169 as shown in Figs. 3 and 7, and is provided with two anti-friction rolls 172 and 173, one of these namely 172, bearing against the guide 27 to take the upward thrust of the truck and the other roll 173 taking the downward pull by bearing against the plate 174. Bracket 170 is secured to the upstanding projection 169ª of the truck 169 by means of two set screws 170ᵇ which are adjustable to cause the rolls to engage guide 27 and plate 174. The truck 169 is provided also with two extending bosses 175 and 176 from which an extending trailer arm 177 is pivoted on conical bearings. This arm is provided with two rolls 178 and 179, roll 178 bearing on the plate 174 and roll 179 extending into the truck guiding slot 168 in order to maintain the roll 178 in alignment against the plate 174. Plate 174 follows the general course of the slot 168. The trailer arm functions to take the rearward thrust of the cutting mechanism.

The carriage 169 is suitably fitted with dovetail slides 180ª and bosses 180ᵇ by which the cutting arm bracket 180 is held, and necessary lateral adjustment is provided for by means of the adjusting screw 181 which is held between the bosses 180ᵇ of the truck 169.

By revolving the knob 183 of screw 181 in either direction, the bracket 180 is caused to travel cross-wise upon the carriage 169. The knife carriage pivoting arm 184 is carried between the arms of the bracket 180 in suitable adjustable cone bearings 185 and 186. Arm 184 carries the supporting plate 188 by means of the spindle 189 which is rigidly attached to the plate 188, passing through suitable hardened bushings securely held in the extending arm and held in position by means of a washer and bolt. The arm 184 is provided with a roll 190 which bears against the hardened surface of the carriage 169 to take the local upward thrust action out of the arm occasioned by the knife 83 penetrating the material to be cut.

The plate spindle 189 carries positioned just beneath the arm 184 an arm 192 swiveled to the spindle and bearing at its outer end a roll 193. A roll 193ª is carried by the spindle 189. A second spindle projecting from the plate 188 carries swivelly secured thereto an arm 194 which has at its outer end a roll 195. A roll 188ª is carried by the second spindle. In order to allow the path of the arm 184 and supported parts to more closely approximate the form of the sole to be cut, a device 28, known as a leader or guide, is supplied (Figs. 1 and 3). This leader has a central opening of the approximate shape but not necessarily of the same area as the sole to be cut, and extending around this central opening is a guide flange 196, the inner side of which is engaged by the rolls 193 and 195, while the outer side is engaged by the rolls 193ª and 188ª. As a result, the plate 188 and supported parts are guided in a path determined by the leader flange 196. The leader is connected to a leader carrier 198 (Fig. 3), which latter is slidable in channels 199 formed in extensions 200 of the arms 150.

Rigidly mounted in the plate 188 is a depending stud 201 on which is pivotally mounted a knife block holder 202, which holder has a direct bearing on the lower end of the stud and has loosely connected thereto a tension adjusting ring 203 surrounding a portion of the stud. Between the ring 203 and the plate 188 is a coil compression spring 204, one end of which is attached to the plate 188 while the other is attached to the tension adjusting ring 203. The ring is adjustably secured in position upon the stud 201 by means of a set screw 205. The spring tends to force the knife block holder laterally on its support 201 and a suitable stop (not shown) projects from the plate 188 to limit the lateral movement. In order to relieve stud 201 of some of the upward thrust to which the knife block holder is subjected during the cutting operation, a roller 206 is provided adapted to bear against the plate 188. The knife block holder carries in a suitable recess 207, the knife block 208. This block is adjustable in the knife block holder in a vertical direction by means of the nut 209 which has screw threaded engagement with a pintle 209ª extending from the block 208 into the holder. A set screw 209ᵇ secures the pintle in the holder. This vertical adjustment permits of varying the cutting position of the knife as the point wears away. The knife block 208 is provided with grooves 210 in which the knife 83 is held at the desired angle and the knife is rigidly held by means of screw 211 which serves to bind the knife block on the knife. By reference to Figs. 11 and 12 it will be seen that the knife block is provided with oppositely inclined knife holding grooves 210 on opposite faces, so that the same knife block serves to hold a knife for cutting either a top or under bevelled sole.

The knife 83 is designed to travel around the pattern at a rapid rate of speed. Patterns as commonly constructed are provided with a pointed projection at the heel portion designed to provide a sole which when attached to a shoe will have a pointed extension which will project up the back seam of the heel higher than any other portion of the cut sole. With the knife traveling at a high rate of speed around the pattern, the throw of the knife in rounding the sharp projection will cause a jerky motion of the same. Provision is therefore made for slowing up the speed of travel of the knife at this portion of its travel. The main truck 169 for the knife through its supports must accurately follow in its course of travel, a slot 168 in the guide 27. This slot extends with elongated sides and circular ends in a course approximating the outlines of a sole, the chain 155 extends approximately parallel with the slot throughout its course except at the portion above the projection of the pattern. Here the sprockets are so positioned upon the bonnet 146 that the chain must travel in a wide path corresponding to the two sides of an isosceles triangle while rounding the heel portion of its circuit, while the truck 169 is passing through a small arc. When the chain pin 155ª rounds the apex of the triangle, which is positioned in vertical alignment with the heel point or projection of the pattern in a plane at right angles to the direction of travel of the knife, the cutting mechanism changes the course of travel of the knife to the opposite side of the heel point of the pattern. The reverse action of the block 163 causes a slight pause as the knife turns the point of the heel. With the chain pin 155ª traveling at a uniform speed over a greater distance at the turn than the carriage 169, the carriage must necessarily travel more slowly until the pin 155ª has rounded the turn.

The elements previously described by which the knife 83 is suspended below the chain 155 are so arranged that the cutting edge thereof is always positioned during its travel abreast of the center point of the driving forces which pass through the pin 155ª. As a result, when the pin 155ª rounds the apex of the outline of a isosceles triangle formed by the three sprockets 156, 159 and 159ª, the cutting edge of the knife is also at the apex of the point of the heel projection and as the pin 155ª travels in its reverse path, the knife is free to do the same. Strain upon the cutting mechanism when rounding the turn is therefore eliminated.

*Bonnet and leader actuating means.*— When cutting an intermediate size of sole the drive bonnet 146 and leader 28 can be left stationary. However, when cutting a larger size, it is desirable that both the bonnet and leader be given a plus movement in synchronism with the knife at each end of its travel around the large sole pattern, in order that the guide paths formed by the slot 168 and leader flange 196 may more closely approximate in length the length of the sole pattern. For a similar reason, it is desirable when cutting a small sole that the bonnet 146 and leader 28 be given a minus movement. To accomplish this purpose the following mechanism is provided (Figs. 1 and 10). Keyed upon the shaft 141 is a pinion 215 meshing with a gear 216 carried by a shaft 217 mounted in the upper part of the head 34. The shaft 217 has ratchet teeth 218 cut into its opposite end face, and these teeth mesh with similar teeth cut in the adjacent face of the shaft 219, carried in suitable bearings 220, in the head 28. By means of the ratchet teeth suitable adjustment is obtained for the purposes of timing the throw of the leader and bonnet with respect to the position of the cutter. Interlocking of the two shafts 217 and 219 is accomplished by means of the bolt 221, the body of which passes through a suitable hole in the shaft 219 and is screwed tightly into the shaft 217. A sprocket is secured to the shaft 219 and acts as a driving means for the chain 222. The chain passes over an idler tension pulley 223 and around two similar sprockets 224 and 224ª, each of which actuates a duplicate mechanism. The sprocket 224 is rigidly secured to a tubular shaft 226 journaled in the head 34. At its opposite end this shaft is formed with an extension block 227 provided with a dovetailed groove for the reception of a slide block 228. Projecting from one side of the slide block 228 is a stud 229, carrying a shoe 230, while on its opposite side the block 228 has attached thereto a vertical rack adapted to cooperate with a pinion 232 secured on the end of a shaft 233 mounted in a locking sleeve 234 within the shaft 226. Pinned to the opposite end of the shaft 233 is an operating knob 235. The shaft 233 is enlarged conically at the base of the pinion 232. The locking sleeve 234 is provided with a split and conical end surface adapted to engage the conical end of shaft 233. A knob 237 is threaded upon the end of the tubular shaft 226 and by means of a tongue and groove connection has rotatable engagement with locking sleeve 234. By turning the knob 235 attached to spindle 233, the pinion 232 is actuated so that the position of the slide block 228 is adjusted in the slot 239 thus creating a variable crank. Turning the knob 237 will force the locking sleeve 234 into engagement with the conical end of the spindle 233 locking it into position. The slide block 230 is movable in a slot 239 in a rock arm 240 pivoted to the head 34 by pin 241. Attached to the other end of the rock arm is a link 242 which at its opposite end is secured to the truck guiding plate 27. The parts 228 and 232 form in effect an adjustable crank on the shaft 226, and when the slide block 230 is disposed in alignment with the shaft 226, the crank will have a zero throw and hence the truck guiding plate 27 and entire drive bonnet 146 will remain stationary. When a large sole pattern is being used, the slide block 230 is adjusted in one direction in the slot 239 to thereby give a plus movement to the drive bonnet synchronous with the movement of the knife or, in effect lengthening the guide groove 168 at each end. When a small sole pattern is being used, the slide block 230 is adjusted in the opposite direction, thereby imparting a minus movement to the drive bonnet and in effect shortening the guide groove 168. The upper end of the rock arm 240 actuated by the gear 224ª is connected by link 231 to the leader carrier 232, and by varying the position of the second slide block 230, the leader 28 can be given a plus or minus movement synchronous with the movement of the knife as above described for the drive bonnet.

*Operation.*—In operation, the desired size of sole pattern 26 is attached to the sole pattern supports and the actuating mechanism of the drive bonnet 146 and leader 28 are adjusted to give the proper movement to them, if a sole other than an intermediate size is to be cut. The desired brand and size dies are connected to the embossing die block 124 and the latter adjusted to properly position it with reference to the opening in the sole pattern. The toggle for varying the throw of the embossing dies is adjusted by actuation of the hand wheel 114. The grip of the pattern 126 and work table 29 upon the stock is adjusted by hand wheel 250.

The operator assembles a strip of sole stock 33 on a second strip 215 formed of rag stock and places the same upon the work table. The rag stock serves to receive the lower end of the cutting blade and thereby prevent injury to the work bed 29. The machine is then started, the stock fed beneath the sole pattern, the head 34 and pedestal 59 lowered and the stock clamped between the sole pattern and the work bed 29. The actual cutting of the sole begins with the knife preferably entering the stock while traveling from the heel around the sole. The knife travels completely around the sole pattern to complete the cutting and then while continuing around the pattern a second time, the head is raised, carrying with it the pattern, and knife. Throughout its travel around the pattern the knife is maintained abreast of the point of transmission of the forces of traction as they are applied from the conveyor 155. As the knife rounds the heel point of the pattern its speed of travel is reduced so that it will not swing away from the pattern by its momentum. While rounding the heel point the blade is turned so as to maintain the cutting edge in engagement with the pattern. After cutting an under bevelled sole, the spindle 69 having been adjusted to have a slight vertical play as the head is raised, will remain stationary with respect to the head until the knife is raised above the stock so that the rising knife is forced laterally and consequently does not cut into the blank. The die is elevated from the stock prior to the pattern, whereby the pattern acts as a means for stripping the material from the die. As the knife continues around the pattern a new portion of the stock is fed beneath the pattern. While the knife is traveling on its second revolution, the head again starts to lower and the second cutting operation begins.

At the beginning of a sole cutting operation, the embossing dies move rapidly downward due to their toggle actuation and the shape of the actuation cam, which movement is slowed down just as the dies come in contact with the stock. This contact occurs at about the time the pattern has clamped the stock against the work bed. The pressure of the dies reaches its maximum when the knife has cut about three-fourths of the way around the pattern, and the dies then start to rise. As the stock is still clamped by the pattern at this time, the latter acts as a stripper for the dies. The dies then remain elevated until the next sole cutting operation begins. By reason of the thrust rod 129 and the adjustability of the medallion block 124, the dies may be readily adjusted so that the thrust of the block 124 will be centralized upon the dies, and by reason of the adjustability of the dies in a longitudinal direction, they may be set at any desired point at the opening of the sole pattern when the latter is changed for a different size.

While the specific embodiment of the invention has been shown and described, it is obvious that numerous modifications in the details will suggest themselves to those skilled in the art, and it is not desired that the invention be limited otherwise than as set forth in the appended claims.

Having thus described my invention what I claim and desire to protect by Letters Patent is:

1. In a machine for severing blanks from sheet material, a pattern having sharp turns in its guiding surface, severing means, a conveyor for drawing the severing means around the pattern with the path of the conveyor varying from that of the severing means, means for connecting the severing means to the conveyor, means for maintaining the severing means in engagement with the pattern, and means permitting lateral play of the severing means with respect to the conveyor to a greater extent than the divergence of the paths of the severing means and conveyor.

2. In a machine for severing blanks from sheet material, a pattern for guiding a severing means in a closed path, severing means, an endless conveyor for drawing the severing means around the pattern in a path which diverges from the shape of the pattern, means for connecting the severing means and conveyor, means for maintaining the severing means in engagement with the pattern, and means permitting lateral play of the severing means to a greater extent than the divergence of the corresponding portions of the paths of the severing means and conveyor.

3. In a machine for severing blanks from sheet material, a pattern having localized projections, conveyor means adapted to travel above and in the general outline of the pattern, severing means, means connecting the severing means to the conveyor means whereby the severing means is maintained abreast of the center point through which the forces of traction are applied from the conveyor means, means for holding the severing means in contact with the pattern, and means for permitting lateral play of the severing means to as great an extent as the amount of divergence of the paths of the severing means and conveyor means.

4. In a machine for severing blanks from sheet material, severing means, means for guiding the severing means in a crooked path, a conveyor for drawing the severing means along the path, connecting means between the severing means and conveyor maintaining said severing means abreast of the center point through which the forces of traction are applied from the conveyor, and means permitting lateral play of the severing means to as great an extent as the divergence of the paths of the severing means and conveyor.

5. In a machine for severing blanks from sheet material, severing means, means for guiding the severing means in an endless path, an endless conveyor for drawing the severing means along the path, connecting means between the severing means and conveyor whereby said severing means is maintained in alignment with the center point of application from the conveyor of the forces of traction in a plane at right angles to the path of travel of the severing means, and means for permitting lateral play of the severing means to as great an extent as the amount of divergence of the paths of the conveyor and severing means.

6. In a machine for severing blanks from sheet material, a pattern adapted to engage the sheet material, severing means for the material, drive means for the severing means, and means for conducting the drive means in an increased path of travel with respect to the severing means at localized portions of the path whereby the speed of the severing means is varied.

7. In a machine for severing blanks from sheet material, severing means, means for guiding the severing means in a predetermined path, a conveyor connected to the severing means for drawing the severing means along the path, and means for causing movement of the conveyor around a longer path than the severing means at a localized portion of its travel whereby a variable speed is given to the severing means.

8. In a machine for severing blanks from sheet material, severing means, means for guiding the severing means in an endless path having sharp turns therein, an endless conveyor connected to the severing means for drawing the severing means along the path, and means for causing movement of the conveyor around a longer path than the severing means at the sharp turns of the guiding means whereby variable speed is given to the severing means.

9. In a machine for severing blanks from sheet material, a guiding pattern for a cutting means, means for disposing the same in contact with the sheet material, a cutting means, means for causing the latter to undercut the material in the outline of the pattern, means for withdrawing the pattern, and means for withdrawing the cutting means from the material prior to the portion of the pattern against which the cutting means contacts whereby the cutting means is moved laterally while being elevated.

10. In a machine for severing blanks from sheet material, a guiding pattern for a cutting means, means for disposing the same in contact with the sheet material, a cutting means, means for passing the latter through the material under cutting the same in the outline of the pattern, means for withdrawing the pattern and cutting means, and means whereby a portion of the pattern is held in contact with the sheet material until the cutting means is removed therefrom.

11. In a machine for severing blanks from sheet material, a guiding pattern for cutting means, means for disposing the same in contact with the sheet material, cutting means, means for causing the latter to under-cut the sheet material in the form of the pattern, means for elevating the cutting means from the sheet material, and means carried by the pattern for causing lateral movement of the cutting means while being elevated.

12. In a machine for severing blanks from sheet material, a guiding pattern for cutting means, means for disposing the same in contact with the sheet material, cutting means, means for causing the latter to under-cut the sheet material in the form of the pattern, means for withdrawing the cutting means from the sheet material, and a flange carried by the pattern for causing lateral movement of the cutting means while the same is being elevated.

13. In a machine for cutting blanks from sheet material, a work bed adapted to carry the material, a support, a vertically movable pattern carried by the support adapted to cooperate with the bed to grip the material, and an embossing member movable through the pattern to independently compress the material against the bed.

14. In a machine for cutting blanks from sheet material, a shaft, an arm carried thereby, a spindle carried by the shaft and connected with the arm for adjusting the arm radially with respect to the shaft, and a locking sleeve interposed between the shaft and the spindle adapted to engage the spindle whereby the arm is held in adjusted position.

15. In a machine for cutting blanks from sheet material, a shaft, an arm carried thereby, a spindle carried by the shaft and connected with the arm for adjusting the arm radially with respect to the shaft a portion of the spindle being tapered, and a locking sleeve interposed between the shaft and the spindle and provided with a tapered portion adapted to engage the tapered portion of the spindle whereby the arm is held in adjusted position.

16. In a machine for cutting blanks from sheet material, a truck adapted to be drawn in movement across the sheet material, an arm pivoted to and extending laterally from the truck to a position beneath the same, anti-friction means associated with the arm adapted to bear against the truck to take the upward thrust, and severing means connected to the arm.

17. In a machine for cutting blanks from sheet material, a truck adapted to be drawn in movement across the sheet material, a truck guide extending adjacent the path of the truck, an arm pivoted to and extending laterally from the truck to a position beneath the same, anti-friction means associated with the arm adapted to bear against the truck to take the upward thrust, a thrust member projecting from the truck adapted to bear against the truck guide to take the rearward thrust of the truck, and severing means connected to the arm.

18. In a machine for under-bevel-cutting blanks from sheet material, a work bed, a pattern and associated cutting means movable around its edge, means for relatively moving the work bed and said other parts, and cooperating means on the pattern and cutting means whereby separation of the work bed therefrom or approach thereto will cause lateral movement of the cutting means.

19. In a machine for under-bevel-cutting blanks from sheet material, a work bed, a pattern having an under bevelled edge pivotally mounted adjacent one of its ends and yieldably mounted adjacent the other end, blank cutting means yieldably engaging the bevelled pattern edge, means for driving the cutting means around the pattern, and means for relatively moving the work bed and said other parts.

20. In a machine for cutting blanks from sheet, plastic and elastic material, a plane surfaced work bed and pattern relatively movable to clamp the material, means for cutting the material around the pattern while clamped, a female die movable through the pattern and cooperating with the bed to emboss the blank during a cutting operation, and actuating means for imparting a preliminary yielding but heavy pressure to the die, said actuating means being retractable prior to the completion of a cutting operation, whereby the pattern acts as a stripper for the die.

Signed at New Haven, county of New Haven, State of Connecticut, this 3rd day of January, 1927.

ROLAND G. ANDERSON.